US007397793B2

(12) United States Patent
Urquizo et al.

(10) Patent No.: US 7,397,793 B2
(45) Date of Patent: Jul. 8, 2008

(54) V.110 OVER PACKET NETWORKS

(75) Inventors: Alex Urquizo, Burlington, MA (US);
Dewey Spencer, Jamaica Plain, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/819,038

(22) Filed: Apr. 5, 2004

(65) Prior Publication Data
US 2005/0220081 A1    Oct. 6, 2005

(51) Int. Cl.
*H04L 12/66* (2006.01)
(52) U.S. Cl. ...................... 370/356; 370/466
(58) Field of Classification Search ......... 370/351–356, 370/400, 401, 465, 466, 389, 390, 392
See application file for complete search history.

(56) References Cited

U.S. PATENT DOCUMENTS

| 6,064,653 | A  | * | 5/2000  | Farris ........................ 370/237 |
| 6,198,738 | B1 | * | 3/2001  | Chang et al. ................ 370/352 |
| 6,208,639 | B1 | * | 3/2001  | Murai ........................ 370/356 |
| 6,236,653 | B1 | * | 5/2001  | Dalton et al. ............... 370/352 |
| 6,421,337 | B1 | * | 7/2002  | Rao et al. .................... 370/351 |
| 6,490,275 | B1 | * | 12/2002 | Sengodan .................... 370/356 |
| 6,563,789 | B1 | * | 5/2003  | Rasanen ...................... 370/230 |
| 6,757,367 | B1 | * | 6/2004  | Nicol ....................... 379/90.01 |
| 6,765,912 | B1 | * | 7/2004  | Vuong ....................... 370/395.2 |
| 6,775,373 | B2 | * | 8/2004  | Stoughton ................... 379/219 |
| 6,807,170 | B1 | * | 10/2004 | Dendi et al. ................. 370/354 |
| 6,826,168 | B2 | * | 11/2004 | Galyas et al. ................ 370/340 |
| 6,873,689 | B1 | * | 3/2005  | Butler et al. ............. 379/93.05 |
| 6,879,680 | B2 | * | 4/2005  | Donovan et al. ......... 379/220.01 |

OTHER PUBLICATIONS

ITU-T (Telecommunication Standardization Sector of ITU) V.110 *Series V: Data Communication Over the Telephone Network; Interworking with other networks, Support by an ISDN of data terminal equipments with V-series type interfaces* (Feb. 2000) (58 pages).
(prepublished recommendation) ITU-T (Telecommunication Standardization Sector of ITU) V.150.1 *Series V: Data Communication Over the Telephone Network, Internetworking with other networks, Procedures for the end-to-end connection of V-series DCEs over an IP network* (Jan. 2003) (144 pages).

* cited by examiner

*Primary Examiner*—Wing F. Chan
*Assistant Examiner*—Duc T Duong
(74) *Attorney, Agent, or Firm*—Marger Johnson & McCollom, P.C.

(57) ABSTRACT

A method of relaying calls across a packet network includes receiving an integrated services digital network setup request. The setup request is then translated into packet network form and transmitted across a packet network. A destination device on the packet network interfaces with the destination device through integrated service digital network procedures. A connect message from the destination device on the packet network is then received and translated into an integrated services digital network connection message. The connection message is then transmitted to an integrated services digital network device to establish a connection.

12 Claims, 4 Drawing Sheets

V.110 OVER PACKET NETWORKS

BACKGROUND

The International Telecommunications Union (ITU) has defined a new standard in the recommendation V.150.1 "Modem over Internet Protocol: Procedure for the End-to-End Connection of V-series Data Communications Equipment," usually referred to as Modem over IP or MoIP. The infrastructure provided in this standard opens the way for transport of other types of data over the same communication path.

In Modem over IP implementations, there are typically two modems, one at either end. The first, or calling, modem communicates with an originating gateway that is linked to a terminating gateway across a packet network. The terminating gateway communicates with the second, or called, modem on the other end. There are generally two different types of Modem over IP implementations. The first is what is referred to as 'voice-band-data (VBD),' in which the modem signals are transported across the intervening packet network using a suitable audio codec. Alternatively, the signals to and from the modems are relayed across the packet network, referred to as 'modem relay.' In the modem relay mode the modem signals are demodulated/modulated at the originating/terminating gateways.

An important protocol that is widely used and therefore important in networking is ISDN (Integrated Services Digital Networks). DTE (Data Terminal Equipment) type devices with 'V-series' interfaces can communicate over the telephone network using ISDN. This is accomplished typically with external DCE (Data Communications Equipment) devices such as TAs (Terminal Adapters). Alternatively, communication may be accomplished using integrated hardware and protocol stacks, which is the case with wireless mobile units such as Wireless Access Point (WAP) enabled phones, personal digital assistants, etc. Communications over ISDN in these cases is commonly implemented in accordance with the ITU recommendation V.110 "Support by an ISDN of Data Terminal Equipment with V-series Type Interfaces." The current V.150.1 recommendation does not cover the relay of V.110 data.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1A:
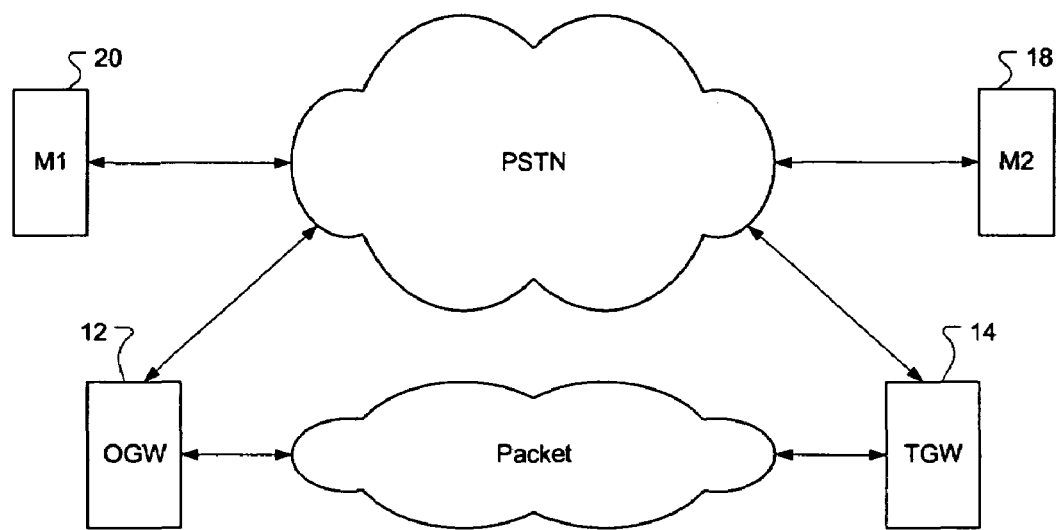
FIGS. 1a and 1b show embodiments of a network implementing a connection in accordance with ITU Recommendation V.150.1.

FIG. 1a shows an example of a network that implements a connection in accordance with ITU Recommendation V.150.1 as an alternative to a direct, PSTN long-distance call. In this example, modem M1 20 could connect through the PSTN to modem M2 18. This call may be a long-distance call.

Figure 1B:
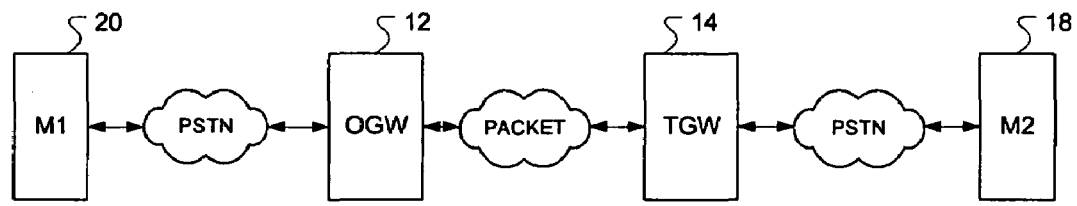

An alternative that allows the call to avoid the tolls associated with long-distance calls would allow the modem M1 20 to dial a local gateway, OGW 12, through the PSTN. The call is routed through a packet network to a terminating gateway TGW 14 in the local calling area of the called modem M2 18. The TGW 14 then connects with the M2 18 and the two gateways pass the modem call through. This connection is shown in a linear fashion in FIG. 1b, which reflects the flow of data more accurately with regards to an implementation of V.150.1. As set out in V.150.1. the transport of the data across the packet network is done in accordance with a reliable transport mechanism, such as UDP (User Datagram Protocol). RTP (Reliable Transport Protocol), and SPRT (Simple Packet Relay Transport).

Figure 2A:
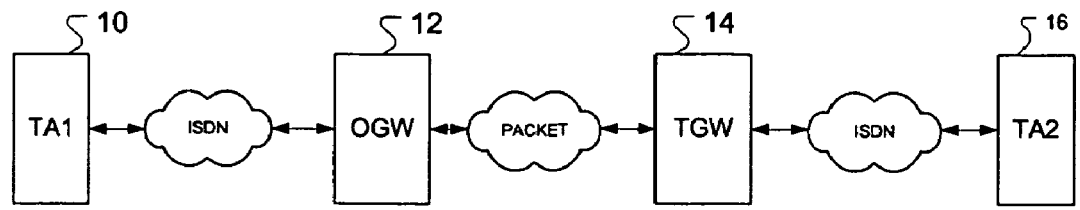
FIGS. 2a-2c show embodiments of a relaying network between two endpoints.

As discussed above, the scenario where the endpoints are not analog or digital modems, but ISDN TA's is not addressed by V.150.1. V.110 enables relatively low speed, $\leq 38.4$ kbps, asynchronous data from the DTE to be transported in the ISDN synchronous B-channel at 64 kbps, thus doing what is known as rate adaptation. A first example of this is shown in FIG. 2a, in which both the calling and called ends of the call use terminal adapters.

Calling device TA1 is an ISDN compatible device. The calling device TA1 10 transmits data to the originating gateway (OGW) 12, in the bearer channel (B-channel), while signaling and control is handled in a data channel (D-channel). The originating gateway receives all of this data and creates packets that can include either the data and/or the control information, as necessary. The packetized information is then transmitted via a packet network, such as an Internet Protocol network. While IP is typically the most common network in this scenario, any network that bundles the data into discrete datagrams, such as Asynchronous Transfer Mode cells, or Frame Relay frames, may be used. The use of IP in the following examples is not intended to limit application of the invention in any way.

Upon arriving at the terminating gateway (TGW) 14, the terminating gateway then translates the information in the packets into either bearer channel streams or control/signaling messages destined for the ISDN switch via the D channel and transmits those via ISDN toward the called device, TA2 16. This allows the ISDN data to be transmitted across a packet network and avoids having to establish a direct link between the calling device 10 and the called device 16. The actual transport of the data will be discussed in more detail further.

Figure 2B:
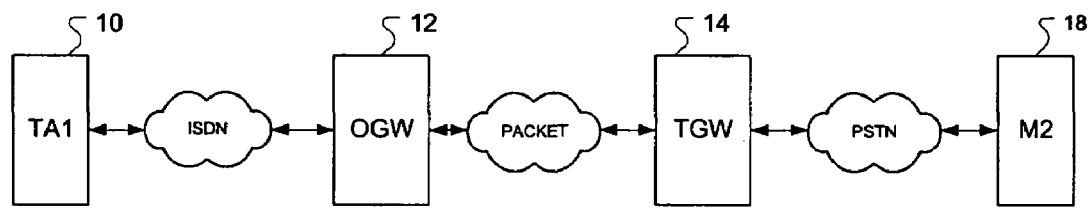

Alternatively, as shown in FIG. 2b, the called device M2 18 may be a regular MODEM, typically analog, and not a V.110 TA utilizing ISDN connectivity. In this case, the terminating gateway would translate the packet data into PSTN compatible modulated data, using well-established MODEM standards, to facilitate communications with the called device.

Figure 2C:
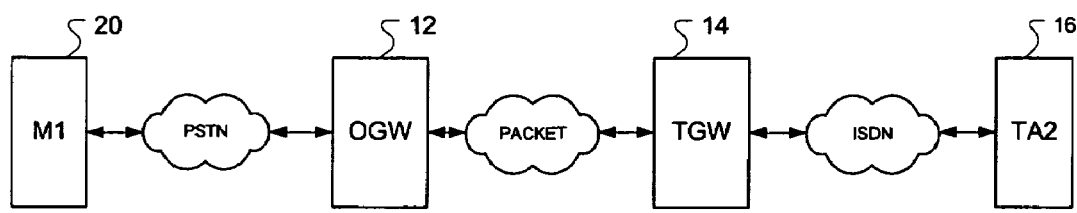

In yet another alternative, shown in FIG. 2c, the calling device 20 may be a regular analog modem attached to the PSTN via a POTS line and the called device 16 may be a V.110 TA connected via ISDN. While this scenario is improbable, it is possible that the gateway has been preconfigured to handle a V.110 connection with the information that the initiating device is in a PSTN environment. If this were to occur, the handling of the data would be very similar to that of FIG. 2b.

Each of these scenarios has two main portions that must be addressed. The first is the call setup between the calling device and the called device using a mix of ISDN signaling and packet transport or ISDN signaling, packet transport and other PSTN signaling types. The second is the actual transport of data. As mentioned above, there are essentially two different scenarios, either V.110-V.110 or V.110-MODEM, with the second scenario also applying to MODEM-V.110.

Figure 3:
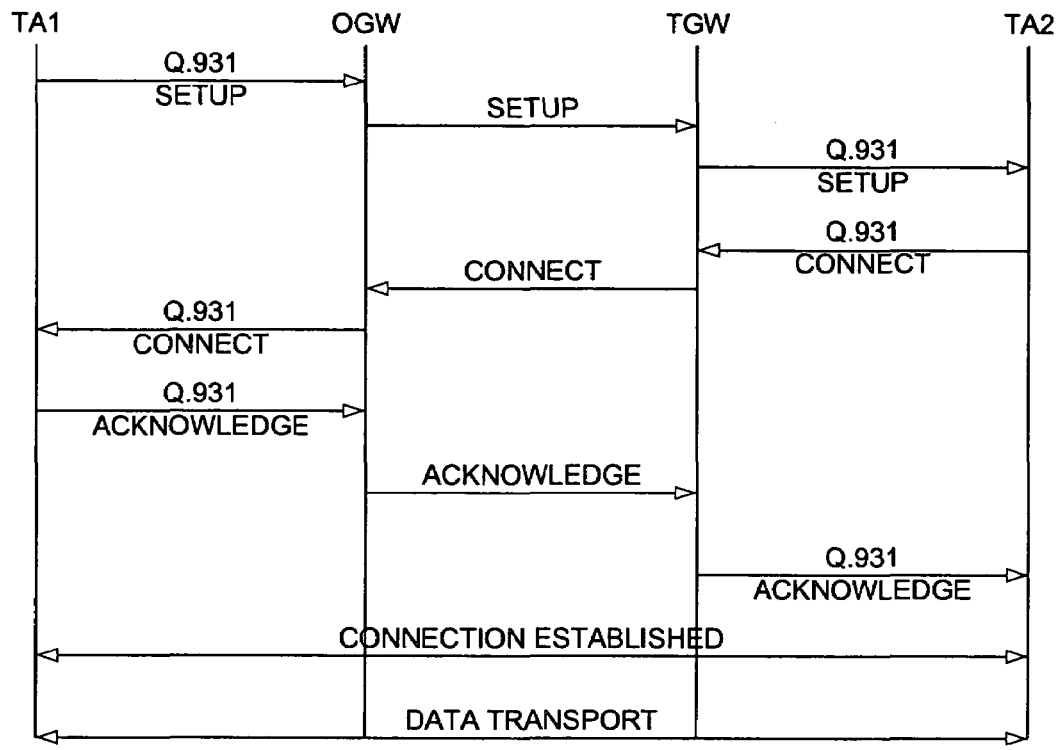
FIG. 3 shows a call flow diagram for an embodiment of a relaying network.

An embodiment of a call flow diagram for V.110-to-V.110 is shown in FIG. 3. The calling device TA1 begins negotiation of the call setup, typically in compliance with ITU Recommendation Q.931, "ISDN User Network Interface Layer 3 Basic Specification for Call Control." The Q.931 setup message from TA1 to the originating gateway will generally occur on the data channel (D-channel) and is translated and sent to the terminating gateway. The media used to transport these signaling messages can be either out-of-band, using an external entity as a Call Agent or Gatekeeper, or in-band, using the current media or requiring a temporary switch to a more suitable media to transport these signaling messages. The components of the setup message that should be transmitted to the terminating gateway include the bearer channel capability, low layer compatibility and the calling party.

The terminating gateway translates this information and transmits it to the called device TA2. The called device then responds with the appropriate Q.931 connect message sequence, which is relayed back to the originating gateway over the packet network. The originating gateway will wait for the message from the terminating gateway, including connection or other messages indicating no connection, before proceeding with the local Q.931 negotiation with the calling device TA1. In some instances, consideration must be given to Q.931 pre-defined timeouts so that the local negotiation does not expire.

The signaling messages from the called device, such as Q.931 CALL PROCEEDING and CONNECT messages, referred to here generally as connect messages. While the packet leg messages for signaling do directly map to Q.931 events and states they are independent of ITU Recommendation Q.931 such that the bearer information and states/transitions can be mapped into whatever local telephone company signaling implementations for which a system is being designed. Q.931 like messages will be used in discussions here. No intention to limit the scope of the invention is intended nor should it be implied. The originating gateway will then complete its local negotiation, such as reception of a Q.931 ACKNOWLEDGE message, which, when relayed to the called device TA2, establishes the call connection. Data transport then commences between the bearer channels (B-channels), established between the two gateways and the two ISDN V.110 devices, across the packet network between the gateways.

It must be noted here that the use of Q.931 messages employed by ISDN may imply that application of this invention is limited to Q.931 and ISDN. These are merely specific examples and the scope of the claims is intended to encompass any evolution of ISDN signaling beyond Q.931, as well as any evolution or replacement of ISDN with another protocol that provides the same type of functions for handling V.110 calls.

Depending upon the resource capabilities of the gateway and the network, several options exist as to the transport of the data. Generally, the two gateways will transport data in whatever format they can commonly agree upon using a signaling protocol such as H.248, H.323, MGCP (multimedia gateway communication protocol) or Media Gateway Control, more commonly referred to as 'Megaco.' Within that protocol, the nature of the data transported may vary.

In one embodiment, the entire V.110 data stream could be transported without modification. This would be the data output from the RA2 V.110 adaptation steps, discussed below. The transmitting gateway would place the frames receiving in a V.110 IP-TLP data type and send across the network to the receiving gateway. This means that the data bandwidth requirements will be 64 kpbs plus the overhead of the IP headers. The receiving gateway would just place this V.110 IP-TLP on the ISDN B-channel. This would effectively be a V.110 pass-through mode.

Alternatively, the intermediate rate data would be transported. This is the data that is output of the RA1 V.110 rate adaptation step, either 8 k, 16 k, 32 k or 64 k depending upon the V.24 interface data rate. V.24 is an ITU Recommendation titled, "List of definitions for interchange circuits between data terminal equipment (DTE) and data circuit-terminating equipment (DCE)." The asynchronous/synchronous user data rates, therefore, is the data that is transmitted across the bearer channel.

In yet another alternative, the synchronous data from the RA0 step, which is used only with asynchronous V-series interfaces, of the V.110 adaptation would be transmitted. V.14 is an ITU Recommendation titled, "Transmission of Start-Stop Characters over Synchronous Bearer Channels." In this instance this is the synchronous data that is converted from incoming asynchronous data to be sent on the bearer channel.

The V.110 rate adaptation steps are such to allow a range of DTE devices which may have differing bit rate interfaces to be adapted to the 64 kbps B-channel in ISDN. The rate adoption typically has 3 steps, RA0, RA1 and RA2. The RAO function is an asynchronous-to-synchronous conversion process using the same technique as defined in Recommendation V.14. It produces a synchronous bit stream defined by $2^n \times 600$ bits/s, where n=0 to 6. This is discussed in more detail in the V.110 specification set forth above. The function RA1 converts the user data signaling rate to an appropriate intermediate rate expressed by $2^k \times 8$ kbps, where k=0, 1, 2 or 3. Lastly the RA2 function adapts the intermediate rate from RA1 to the 64 kbps B-channel.

In order for the Terminating gateway to know the format of the data being transported, an IP-TLP message is exchanged that indicates the format of the V.110 frame being sent. This is contained in the link layer control at the Q.931 layer). This allows the frame to be reconstructed accordingly by the other gateway. In order for the current message to conform to the current standard, it would typically have the format of:

| R | MSGID | V | Data format as specified in V field |
|---|-------|---|-------------------------------------| where R is reserved by the ITU, the MSGID is a 7-bit field whose value identifies the message, and V is a 2-bit field that specifies the format of the data.

Typically, the data format would be of a byte boundary. If only V.14 data is sent, data could be byte-bounded by padding it with zeros (0s). If padding were done, a 3-bit field would need to be added to indicate how many padding bits there are.

Figure 4:
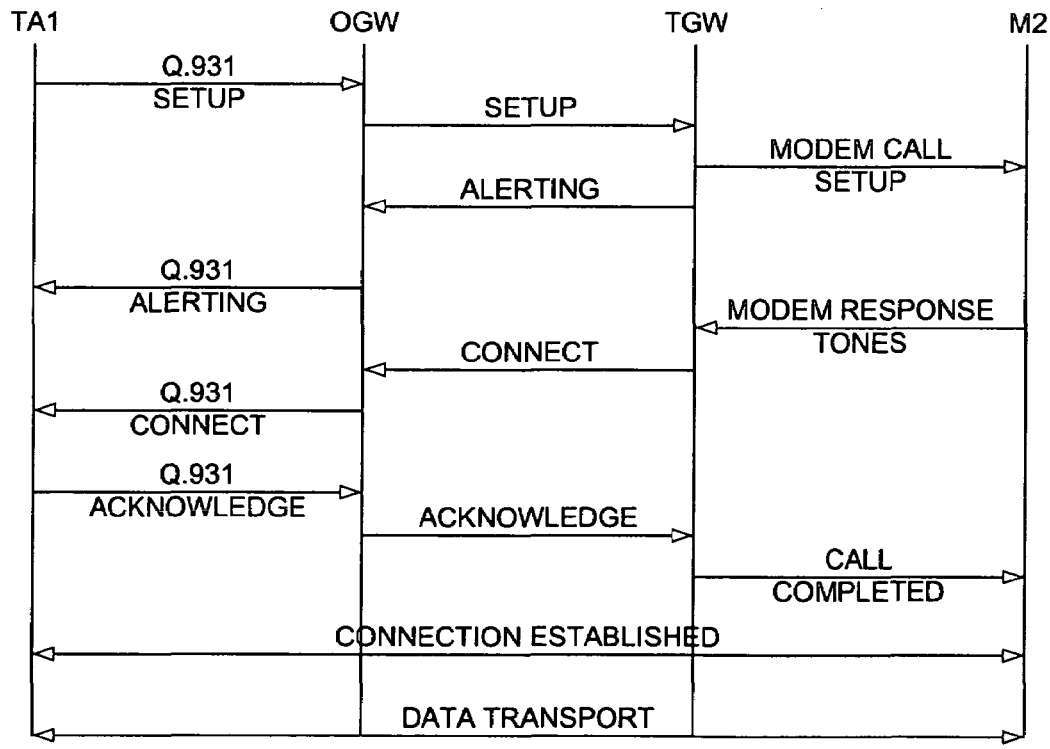
FIG. 4 shows a call flow diagram for another embodiment of a relaying network.

In the V.110-V.110 scenario, all three of the above alternatives may be available. In other scenarios, such as V.110-MODEM, options may be limited. An embodiment of a call flow diagram for an V.110-MODEM scenario, where the calling device is ISDN and the called device is PSTN, is shown in FIG. 4. The process of call setup again begins with the Q.931 setup message being translated by the originating gateway and transmitted to the terminating gateway. However, the terminating gateway must now convert the information into the modem pulse tones necessary to set up a modem call with the called device.

As mentioned earlier, Q.931 sessions may expire locally while waiting for call set up at the other end of the transactions. The terminating gateway, being aware of the PSTN modem call requirement at the called device end, may transmit a Q.931 like alerting message or other type of message back to the originating gateway, to keep the local session alive at the originating end during the modem call set up. When the terminating gateway receives the modem response tones indicating connection, it must translate those into the data usable on the ISDN/V.110 end and transmit that information via the packet network.

When the calling device acknowledges the connection, the terminating gateway again modulates that information into modem tones and the connection is established. Within this scenario, the data will more than likely be transported according to the third option discussed above, where the V.14 data is extracted form the V.110 stream and transported.

As mentioned above, it is not very probable that a situation will arise that a PSTN calling device will utilize the embodiments of the invention, unless the gateway is adapted to use V.110 mechanisms with a PSTN call. If, however, that scenario does arise, the process would be very similar to the ISDN-PSTN situation, except that the translations would flow in the opposite direction.

Figure 5:
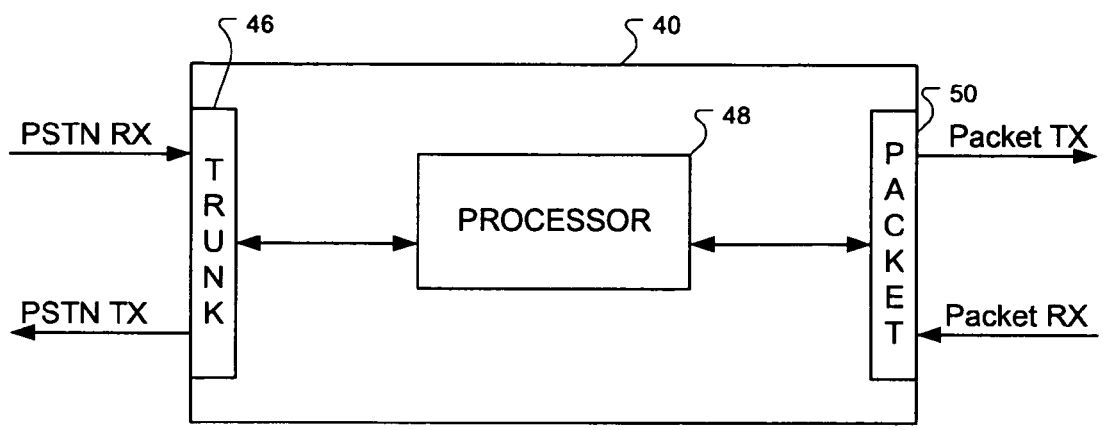
FIG. 5 shows an embodiment of a gateway in a relaying environment.

Enabling these functions are the gateways. An example of a gateway having an ISDN interface and a packet interface is shown in FIG. 5. This gateway may be an originating gateway or a terminating gateway depending on the direction in which the call was placed. Both gateways are peers but the OGW was the gateway called initially and is the ingress point to the packet network, while the gateway that will be the egress point for data going back out into the PSTN is called the terminating gateway. Beyond identifying which entity placed the call and which endpoint was the destination, both OGW and TGW will behave in the same manner once the call has been established. Access servers and gateways such as that shown in FIG. 5 typically use trunks, which are a number of channels grouped together into a logical entity. For example, a T1 line is a trunk made up of twenty-four 64K channels. The trunk type is dependent upon the signaling. The interface to the PSTN as defined here will be referred to as a trunk network interface, as there is no intention to limit the type of signaling used.

As a gateway, the trunk network interface receives data from the TA1 across the ISDN network or connection, as shown in FIG. 2a. A processor 48 then operates on the ISDN data (Signaling and V.110 frames) to convert it to the necessary packet format, as mentioned above. The V.110 session data would be taken from both the D-channel and the B-channel as appropriate for a given call and framed into packets for transport. The data then exits the device through the packet network port 50 as indicated by the Packet TX arrow.

When a gateway receives these packetized V.110 session data transmissions from the packet network through the packet network port or interface 50 as shown by the Packet RX arrow. The processor 48 would then parse the packets out into data and control signals and send them out on the appropriate channel through the ISDN interface 46 to the TA. In this manner, the ISDN signals and data are transported across the packet network.

If the device on the called end is a PSTN device, the terminating gateway 40 may received from the packet network, such as a connect message, through packet port 50. The processor 48 then modulates that data into modem setup tones and transmits them to the PSTN device through the trunk port 46. The PSTN port 46 would receive response tones and the processor would convert then to the packet data to be sent out the packet port from the terminating gateway. It is possible that the methods and techniques of the invention could be implemented by upgrading the operating instructions on existing devices, or as an article of machine-readable code. The article would contain the instructions that, when executed by a processor in the device such as those shown in FIG. 5, cause the machine to perform the methods of the invention.

Thus, although there has been described to this point a particular embodiment for a method and apparatus for relay of V.110 data across a packet network, it is not intended that such specific references be considered as limitations upon the scope of this invention except in-so-far as set forth in the following claims.

What is claimed is:

1. A method of relaying calls across a packet network, comprising:
   receiving V.110 data from an integrated services digital network for a V.110 relay call;
   translating the V.110 data into packet network form by extracting V.110 data from a bearer channel and packetizing the V.110 data into packets of a V.110 relay data stream;
   transmitting a message to notify a receiving device of a format of the V.110 data; and
   transmitting the V.110 relay data as V.14 payload data with no V.110 framing across a packet network to the receiving device, wherein the receiving device is a V.110 capable device attached to an integrated services digital network.

2. The method of claim 1, transmitting V.110 relay data across a packet network to a receiving device further comprising transmitting data extracted from a V.110 relay data stream to a publicly switched telephone network device.

3. The method of claim 1, transmitting the V.110 relay data further comprising transporting an entire V.110 data stream without modification.

4. The method of claim 1, transmitting the V.110 relay data further comprising transporting at an V.110 intermediate data rate.

5. The method of claim 1, the method further comprising capability of the receiving device and a form of the V.110 relay data using a protocol selected from a group consisting of: H.323, H.248, and multimedia gateway communication protocol.

6. A method of relaying calls across a packet network, comprising:
   receiving a message from the packet network identifying a format of V.110 packet relay data;
   receiving the V.110 relay data from the racket network as uncompressed V.14 modem relay data from a publicly switched telephone network;
   determining a format of the V.110 data from the message;
   translating the V.110 relay data into V.110 data by translating the V.110 relay data stream into a bearer channel stream; and
   transmitting the V.110 data to an integrated services digital network device.

7. The method of claim 6 receiving V.110 relay data further comprising receiving V.110 data from an integrated services digital network device across the packet network.

8. A network device comprising:
   a trunk network interface;
   a packet network interface; and
   a processor to perform at least one of:
      receive integrated services digital network data on the trunk network interface for a V.110 call, translate the data to packet data by extracting data from a bearer channel, packetize the data and an identification of a format of the data and transmit the packet data across a packet network;

receive a message indicating a format of V.100 packet relay data; and receive V.110 relay data on the packet data interface, determine the format of the V.110 data from the message, translate the V.110 data into trunk network data by parsing the packets into telephone network signals and transmit the signals through the trunk network interface to a device as V.14 payload data with no V.110 framing.

9. The network device of claim 8, the processor to translate the V.110 relay data further to translate the V.110 relay data into publicly switched telephone network modem tones.

10. The network device of claim 8, the processor to translate the V.110 relay data further to translate the V.110 relay data into bearer channel signals for an integrated services digital network device.

11. A method of relaying calls across a packet network, comprising:

receiving V.110 data from an integrated services digital network for a V.110 relay call;

translating the V.110 data into packet network form by extracting V.110 data from a bearer channel and packetizing the V.110 data into packets of a V.110 relay data stream; and transmitting the V.110 relay data as V.14 payload data with no V.110 framing across a packet network to a V.110 capable device attached to an integrated services digital network.

12. A method of relaying calls across a packet network, comprising:

receiving V.110 relay data as uncompressed V.14 modem relay data from a publicly switched telephone network access across the packet network;

translating the V.110 relay data into V.110 data by translating the V.110 relay data stream into a bearer channel stream; and transmitting the V.110 data to an integrated services digital network device.

* * * * *

UNITED STATES PATENT AND TRADEMARK OFFICE
CERTIFICATE OF CORRECTION

PATENT NO.       : 7,397,793 B2                                          Page 1 of 1
APPLICATION NO.  : 10/819038
DATED            : July 8, 2008
INVENTOR(S)      : Alex Urquizo and Dewey Spencer It is certified that error appears in the above-identified patent and that said Letters Patent is hereby corrected as shown below:

Column 6, line 50, the word "racket" should read -- packet --.

Signed and Sealed this

Twentieth Day of January, 2009

JON W. DUDAS
*Director of the United States Patent and Trademark Office*